United States Patent
Swinton et al.

(10) Patent No.: US 7,827,276 B2
(45) Date of Patent: Nov. 2, 2010

(54) SYSTEM AND METHOD FOR PROVIDING LATENCY SIGNATURES

(75) Inventors: Jeffrey H. Swinton, Mendham, NJ (US); Douglas M. Pasko, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 290 days.

(21) Appl. No.: 11/964,582

(22) Filed: Dec. 26, 2007

(65) Prior Publication Data

US 2009/0172186 A1 Jul. 2, 2009

(51) Int. Cl.
*G06F 15/173* (2006.01)
(52) U.S. Cl. ........................................ 709/224; 709/238
(58) Field of Classification Search .................. 709/224, 709/238

See application file for complete search history.

(56) References Cited

U.S. PATENT DOCUMENTS

| | | | |
|---|---|---|---|
| 7,020,719 B1* | 3/2006 | Grove et al. | 709/238 |
| 7,392,325 B2* | 6/2008 | Grove et al. | 709/238 |
| 2004/0143672 A1* | 7/2004 | Padmanabham et al. | 709/231 |
| 2005/0044270 A1* | 2/2005 | Grove et al. | 709/238 |

* cited by examiner

*Primary Examiner*—Shawki S Ismail (57) ABSTRACT

A system and method for providing latency signatures including a transmitter to transmit a request for one or more latency signatures from one or more servers, a receiver to receive one or more latency signatures from the one or more servers based on the request, and one or more processors to compare the one or more latency signatures in the event there is more than one latency signature for determining optimum connectivity between the one or more clients. The one or more latency signatures provides positioning information of one or more clients relative to the one or more servers in a network.

25 Claims, 3 Drawing Sheets

SYSTEM AND METHOD FOR PROVIDING LATENCY SIGNATURES

BACKGROUND INFORMATION

File sharing and on-line gaming are becoming extremely popular. However, these peer-to-peer applications depend on the speed of signal transmission between network components. For example, the distance that signals have to travel between users on the Internet (e.g., network distance), the longer in time it may take for the applications to communicate with each other. As a result, any delay in communication (e.g., latency) leads to substantially reduced performance in file sharing or on-line gaming applications. Current systems determine relative network distance between users based on geography or individual pings. However, neither is particularly useful. Geographical distance is not the same as a network distance in peer-to-peer operations. For example, the network distance in which a packet or signal may travel between two users in two different cities may be shorter than a packet or signal traveling between two users living next door to each other. Individual pings provide information relating to network distance but are adequate for only a small number of users. For example, it is highly impractical or nearly impossible for a user to send individual pings to a large number of users, e.g., numbering in the hundreds, thousands, or millions. As a result, current systems lack a technique for comprehensively and effectively determining latency based on network distances between users to optimize on-line interactivity and Internet performance.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. Wherever possible, the same reference numbers will be used throughout the drawings to refer to the same or like parts. It should be appreciated that the following detailed description are exemplary and explanatory only and are not restrictive.

Exemplary embodiments may provide a system and method for providing latency signatures. That is, exemplary embodiments may, among other things, expand on-line interactivity and Internet performance by providing latency signatures based on network distance between users.

The exemplary systems and methods are discussed in terms of providing "latency signatures." It should be appreciated that as used herein, a "latency signature" may refer to a location or position of a user, server, or client system relative to other users, servers, and/or client systems in a network. Similar to how a global positioning system (GPS) provides actual coordinates, a latency signature may provide "coordinates" based on time for a packet/signal travels to or from known or "fixed" locations (e.g., a centralized server).

It should be appreciated that a latency signature may be affected by several factors. These factors may include network distance, available bandwidth, etc. For example, a "network distance," as used herein, may refer to the distance a packet or signal travels to get from one point to another. Much like a distance an automobile travels from a starting point to a destination point (e.g., along various streets, highways, roadways, intersections, etc.), a packet or signal may also travel along a network distance from one user device to another. Just as an automobile may experience various traffic patterns as it travels a given path, a packet or signal may experience similar traffic patterns based on available bandwidth. For example, just as travel time for an automobile depends on several factors, such as size/type of automobile, size/type of road (e.g., 4-lane highway, dirt road, etc.), time (e.g., time of day, week, month, or year, etc.), and location (e.g., China, India, Europe, etc.), latency for packet/signal transmission may be affected by similar factors, e.g., type/size of packet or signal, transmission medium, time, location, and/or other similar factors affecting latency. These and other factors may be taken into consideration when determining a latency signature for a particular user, server, and/or network system.

It should be appreciated that a network, such as the Internet, is amorphous and does not have a definitive structure. Therefore, an exact position of user, server, or client system, for example, may not be readily pinpointed within a network as dynamic as the Internet. As a result, a "latency signature" that refers to a relative position a user, server, or client system in such a network may be more useful because even as a network changes or evolves (e.g., adding, subtracting, relocating, and/or replacing various network components), a latency signature may adapt and provide relative location and/or positioning information.

It should also be appreciated that as used herein, "ping" or "pinging" refers to sending one or more packets or signals. Specifically, sending a "ping" or "pinging" may refer to sending one or more packets or signals to determine a network distance and/or latency between network components. In one embodiment, sending a ping or pinging may refer to transmitting an ICMP (Internet Control Message Protocol) echo request. In another embodiment, sending a ping or pinging may refer to transmitting a TTCP (Test Transmission Control Protocol) request.

Figure 1:
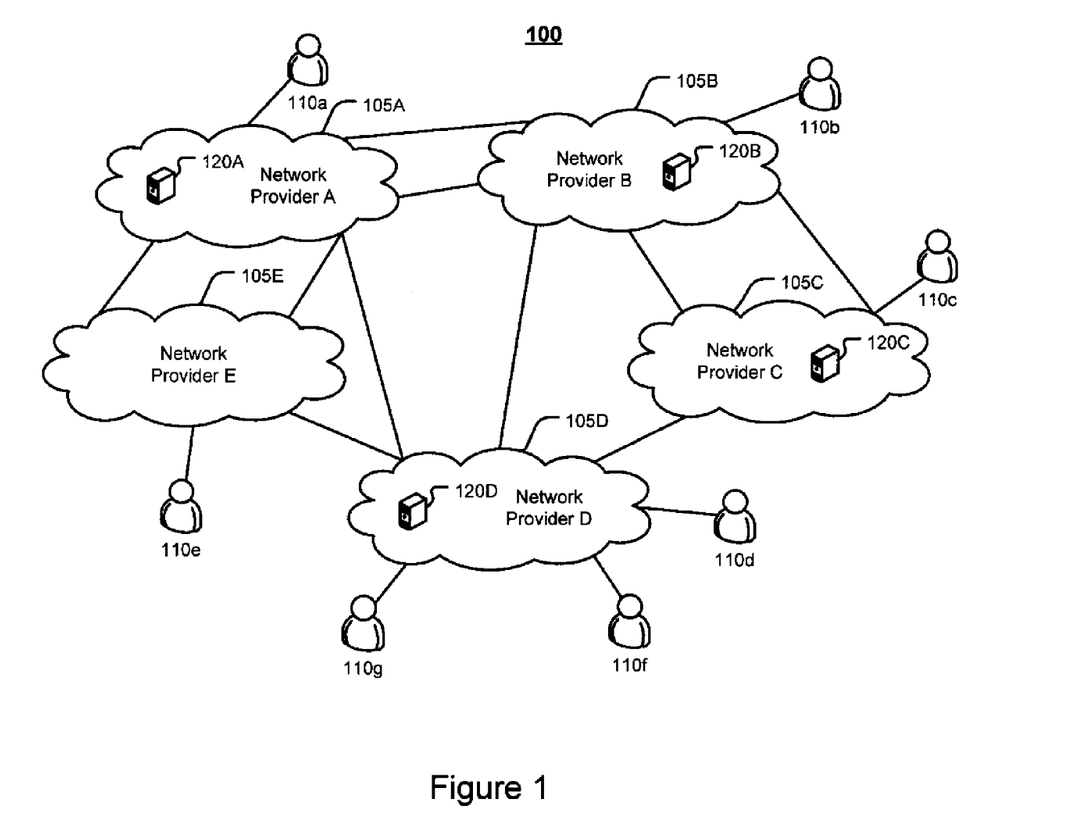
FIG. 1 depicts a block diagram of a system architecture, according to an exemplary embodiment.

FIG. 1 depicts a block diagram of a system architecture 100, according to an exemplary embodiment. It should be appreciated that system 100 is a simplified view of a network and may include additional elements that are not depicted. As illustrated, the system 100 may be a network system having a number of network providers interconnected with each other. Each of the network providers may also include one or more clients. For example, FIG. 1 depicts five (5) network providers: Network Provider A 105A, Network Provider B 105B, Network Provider C 105C, Network Provider D 105D, and Network Provider E 105E. In this example, each of the network providers 105A-105E may include one or more clients. For instance, Network Provider A 105A may be communicatively coupled to client 110a, Network Provider B 105B may be communicatively coupled to client 110b, Network Provider C 105C may be communicatively coupled to client 110c, Network Provider D 105D may be communicatively coupled to client 110d, client 110f, and client 110g, and Network Provider E 105E may be communicatively coupled to client 110e. The network system 100 may also include one or more centralized servers 120A-120D.

The clients 110a-110g may include various communications systems and/or devices. For example, such systems and/or devices may include desktop computers, laptops/notebooks, Personal Digital Assistants (PDA), smart phones, wireline phones, cellular phones, mobile phones, satellite phones, MP3 players, video players, personal media players, personal video recorders (PVR), watches, gaming consoles/devices, navigation devices, televisions, printers, and/or other devices capable of receiving and/or transmitting signals.

The network system 100 may be the Internet or other network utilized for connecting various network providers and/or clients. In one embodiment, the network providers 105A-105E may be Internet service providers (ISPs). The clients 110a-110g may be systems and/or devices by which subscribers of the one or more network providers 105A-105E may communicate with other subscribers. Communication between the various network providers 105A-105E of the network system 100 may be achieved via one or more network connections. For example, in the event a subscriber at client 110a wants to share files or play an on-line video game with a user at client 110f, a communication link may be established by transmitting and/or receiving signals via the one or more network connections between these clients.

Communication between the various network providers and/or clients may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or clients may also use standard wireless protocols including IEEE 802.11a, 802.11b, 802.11g, etc., or via protocols for a wired connection, such as an IEEE Ethernet 802.3.

It should be appreciated that while FIG. 1 only depicts five (5) network providers (e.g., 105A-105E) and seven (7) clients (e.g., 110a-110f), a greater or lesser number of network providers and/or clients may also be provided. Furthermore, it should be appreciated that the network system 100 and/or network providers may be a small network or a large network. It should also be appreciated that each network provider may have many more than one client (e.g., Network Provider D being communicatively coupled to clients 110d, 110f, 110g). It should be appreciated that each of the one or more clients may be communicatively coupled to a plurality of network providers as well. Other various embodiments may also be provided.

As discussed above, the performance of file sharing and on-line gaming applications, for example, may substantially rely on communication quality/speed between network providers and/or clients. Because network distances vary between network providers and/or clients, the relative distance between users may therefore be an important factor in maximizing communication and overall on-line interactivity/performance in these file sharing and gaming applications. Conventional systems, however, may determine relative distance between users at various clients based on geography or individual peer-to-peer pings. As discussed above, neither is particularly useful. Accordingly, utilizing one or more centralized or "fixed" servers in a network system 100 may provide comprehensive and effective determination of latency signatures to enable users to optimize performance in file sharing and gaming applications.

For example, referring back to FIG. 1, the network system 100 may have four (4) centralized servers. In this example, Network Provider A 105A may include server 120A, Network Provider B 105B may include server 120B, Network Provider C 105C may include server 120C, and Network Provider D 105D may include server 120D. It should be appreciated that each of the centralized servers 120A-120D may be deployed at a number of centralized test points throughout the network system 100, on different network providers, in different cities, and/or on different continents. In one embodiment, the centralized servers 120A-120D may be dedicated for each application (e.g., file sharing application, on-line video game, or other peer-to-peer application). In another embodiment, the centralized servers 120A-120D may be used for multiple applications. Each of the centralized servers 120A-120D may have one or more receivers configured to receive requests for latency signatures from one or more clients 110a-110f and may have one or more transmitters configured to transmit one or more pings to one or more clients 110a-110f in response to the receive requests for latency signatures. As a result, the centralized servers 120A-120D may reply to various pings (e.g., ICMP echo requests) by one or more clients and/or generate latency signatures for each of the various clients in the network system 100. This latency signature may assist users in determining relative distances and ultimately with whom they want to communicate.

In the event all of the subscribers at clients 110a-110f want to play an interactive video game over the network system 110, it may be important for each of the clients 110a-110f to determine with which other potential gamer would be "best" to play. In this example, a video game software application that is communicatively coupled to a game server (not shown) may ask the subscriber at client 110a to select other gamers to play against. Since significant latency between the subscriber and other gamers may be a potential hindrance to the performance of the video game, the subscriber may obtain latency signatures for each of the other potential gamers before selecting gamers with which to play. Rather than depending on mere geography of the other gamers or inefficiently pinging all of the other potential gamers, the subscriber may simply ping a predetermined number of centralized computers (e.g., servers 120A-120D) to retrieve the subscriber's own latency signature. Each of the other clients 110b-110f, when initiating the interactive video game, may also ping the same centralized computers (e.g., server 120A-120D) to retrieve their respective latency signatures.

Although acquiring latency signatures is related to how GPS (Global Positioning System) works, which provides an actual determination of position based on satellites positioning, these centralized servers may function as "fixed" points on the network system 100. For example, once the subscriber at client 110a pings the four centralized servers 120A-120D, the latency signature of the subscriber may be stored at the client 110a, one or more of centralized servers 120A-120D, other data storage systems, or a combination thereof. Each of the other clients, e.g., 110b-110f, may also retrieve and store their respective retrieved latency signatures in a similar fashion. As a result, the subscriber may determine which potential gamers with whom to connect for optimum connectivity and thus entertainment value.

In another embodiment, the subscriber may ping a predetermined number of centralized computers (e.g., servers 120A-120D) to retrieve the subscriber's own latency signature as well as the other clients' latency signatures. In this example, once the subscriber at client 110a pings the four centralized servers 120A-120D, the centralized servers 120A-120D may ping all the other potential gamers at clients 110b-110f to receive all the necessary information to generate latency signatures for each client at clients 110a-110f based upon relative positioning to these "fixed" centralized server positions. This information may then be returned to the subscriber (as well as the other potential gamers) to determine the relative position of the each of the gamers to at least these "fixed" points on the network system 100. As a result, the subscriber may determine which potential gamers with whom to connect for optimum connectivity and thus entertainment value.

In one embodiment, a latency signature for client 110a may be expressed as ten (10) for server 120A, twenty (20) for 120B, fifty (50) for server 120C, fifty (50) for server 120D, and a latency signature for client 110b may be expressed as twenty-five (25) for server 120A, fifteen (15) for 120B, twenty-five (25) for server 120C, fifty (50) for server 120D. In another embodiment, the latency signature may be provided in shorthand as [10, 20, 50, 50] for client 110a and [25, 15, 25, 50] for client 110b. It should be appreciated that in this example, a latency signature, although a function time based on relative distance to various centralized servers, may provide functionality similar to that of "coordinates." Other various latency signature formats may also be provided.

Once latency signatures are generated, they may be compared with one another to determine which clients, when connected to each other, may provide optimum communication. For instance, client 110d and client 110f may have substantially similar latency signatures, if not the same. In the event latency signatures are exactly the same, this may be considered the "best" fit for the clients. If the latency signatures are similar, having only minor variance, latency signature comparison techniques may be configured to determine what to do in such situations. For example, there is no client system that is close to client 110e, yet client 110e may have similar values in its latency signature to servers 120B and 120C when compared to clients 110a, 110f, and 110f. Accordingly, various comparison techniques may be provided to compare latency signatures and determine the potential connections between clients when latency signatures are not exact matches. For instance, latency signature comparisons may include various comparison techniques, such as scoring, weighted scoring, least means squared analysis, etc. Ultimately, clients having latency signatures that are the same or substantially similar to all these "fixed points" may represent clients that have the shortest network distance and thus great potential performance.

In one embodiment, for example, latency signatures may be compared at the one or more centralized servers 120A-120D. In another embodiment, the latency signatures may be compared by the clients after receiving them from the one or more centralized servers 120A-120D. In yet another embodiment, latency signatures may be compared at other external servers and/or systems (e.g., game server). Furthermore, latency signature comparisons may be automatic, semi-automatic, manual, or a combination thereof. For example, once the centralized servers generate the latency signatures, comparisons may be automatically performed by the centralized servers so that only the scores/rankings of the potentials gamers are presented to the clients. Thus, a gamer may initiate/enter an on-line game from his computer, and by virtue of initiating/entering the game, a list of potential plays with whom he can choose to play may be automatically populated with corresponding latency signatures. In this example, the client system or the game server hosting the game may ping the centralized servers automatically, acquire latency signatures, and rank the potential players according to their performance-capability based on the acquired latency signatures. Alternatively, the centralized servers may present the subscriber all the generated latency signatures and the subscriber may manually determine with whom to play against based on the presented latency signature. For example, a gamer may view the latency signature of each potential gamer and determine with whom to play based on manual comparison. In yet another embodiment, for example, a semi-automatic feature for comparing may be provided where the centralized servers or clients may compare the latency signatures and present both the latency signatures and the comparison results to the subscriber to make a manual decision. It should be appreciated that the presentation of the latency signatures and/or comparison results may be customized and/or stored by the clients, centralized servers, game servers, and or other network system components.

Although four (4) centralized servers are depicted in FIG. 1, it should be appreciated that a greater or lesser number of centralized servers may be used. In one embodiment, the number of centralized servers may be in a range of four (4) to ten (10). In another embodiment, the number of centralized servers may be in a range of six (6) to eight (8). Other various embodiments may also be provided.

Furthermore, it should be appreciated that although file sharing and on-line gaming applications are described primarily with regard to FIG. 1, these applications are provided as merely exemplary. Other applications whose performance may benefit from determining latency signatures may also be provided. These may include marketing and advertisement-directed media, dating services, social networking applications, content delivery, peer-to-peer applications, etc. Additionally, it should also be appreciated that providing (e.g., setting up) one or more centralized servers within a network is not limited to physical and actual server positioning or deployment. Instead, providing one or more centralized servers may include transmitting and/or installing software at one or more existing servers at various network providers and/or components in the network system 100 so that these one or more servers may be configured to operate as one or more centralized servers. Similarly, it should be appreciated that similar transmission and/or installing software may be utilized to update, modify, and/or customize one or more clients and/or other network components as well.

Each of the centralized servers 120A-120D may include one or more processors (not shown) for generating the latency signatures, comparing the latency signatures, and/or determining the best matches based on the latency signature comparisons. Data and/or information used or outputted from such processing may be stored and/or indexed in one or more databases (not shown) communicatively coupled to the one or more processors of each of the centralized servers 120A-120D. In one embodiment, latency signatures may be provided in real-time or near real-time. In another embodiment, latency signatures may be provide only upon request. In yet another embodiment, latency signatures may be provided on a periodic basis in predetermined intervals of time. For example, the one or more processors of a centralized server may be synchronized with a clock and may ping various clients at predetermined intervals. This may be particularly useful in extended on-line interactivity between clients where at least one client may be traveling, using a mobile client device, or causing the latency signature to change during any given communication.

Although each of the centralized servers 120A-120D is depicted as one server, it should be appreciated that the contents of each of the centralized servers 120A-120D may be combined into fewer or greater numbers of servers (or server-like devices) and may be connected to one or more data storage systems (not shown). In addition to receiving/transmitting pings (e.g., echo requests) and/or generating latency signatures, each of the centralized servers 120A-120D may perform additional functions and features. For example, each of the centralized servers 120A-120D may store additional data and/or information relevant for personalized functionalities. For example, each of the centralized servers 120A-120D may store data including customer habits, frequency of latency signature requests, automatic updates for various clients, etc. This data may be used for clients that regularly request latency signatures or are frequently looking for client interactivity. Each of the centralized servers 120A-120D may also customize or personalize subscriber services by recording, storing, and/or indexing additional data/information related to customer preferences and/or on-line habits. Other various embodiments may also be provided.

It should be appreciated that one or more data storage systems (e.g., databases) (not shown) may also be coupled to each of the devices or servers of the system 100. In one embodiment, the one or more data storage systems may store relevant information for each of the servers and system components. Exemplary database information may include latency signature request information, latency signatures, ratings, advertisements, client-related information, and/or other information provided by a client, network provider, centralized server, external storage source, or other third party source.

It should be appreciated that the contents of any of these one or more data storage systems may be combined into fewer or greater numbers of data storage systems and may be stored on one or more data storage systems and/or servers. Furthermore, the data storage systems may be local, remote, or a combination thereof to clients systems, servers, and/or other network components In another embodiment, information stored in the databases may be useful in providing additional customizations for comparing latency signatures and/or enhanced performance for on-line interactivity.

By performing the various features and functions as discussed above, on-line performance may be efficiently provided (e.g., without significant delay) in various latency-sensitive applications. Not only does this provide an effective and improved technique for providing on-line interactivity and overall network performance in specific applications, it may also enhance overall computing and/or multimedia experience.

Figure 2:
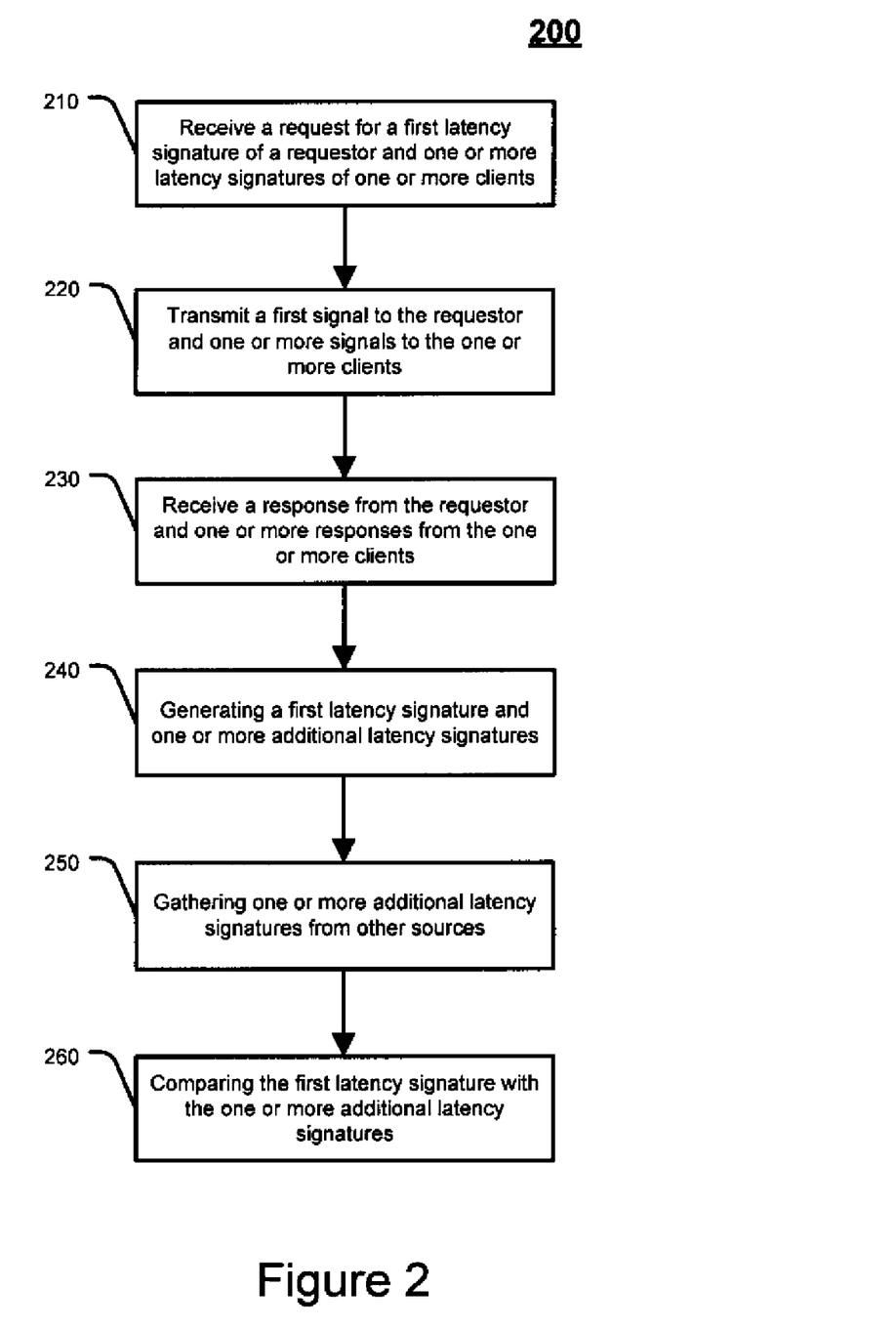
FIG. 2 depicts a flowchart of a method for providing latency signatures, according to an exemplary embodiment.

FIG. 2 depicts a flowchart of a method for providing latency signatures 200, according to an exemplary embodiment. The exemplary method 200 is provided by way of example, as there are a variety of ways to carry out methods disclosed herein. The method 200 shown in FIG. 2 may be executed or otherwise performed by one or a combination of various systems. The method 200 is described below as carried out by the system 100 shown in FIG. 1 by way of example, and various elements of the system 100 are referenced in explaining the example method of FIG. 2. Each block shown in FIG. 2 represents one or more processes, methods, or subroutines carried in the exemplary method 200.

A computer readable media comprising code to perform the acts of the method 200 may also be provided. Referring to FIG. 2, the exemplary method 200 may begin at block 210.

At block 210, one or more requests may be received. For example, a first receiver in at least one of the centralized servers 120A-120D may be configured to receive a request, from a requester, for a first latency signature corresponding to the requestor and for one or more additional latency signatures corresponding to one or more clients. In one embodiment, the one or more requests may be an ICMP (Internet Control Message Protocol) echo request, a TTCP (Test Transmission Control Protocol) request, or other signal requesting latency and/or network distance information.

At block 220, one or more signals based on the one or more requests may be transmitted. For example, a transmitter in at least one of the centralized servers 120A-120D may transmit to the requestor a first signal and one or more additional signals to the one or more clients based on the request. In one embodiment, the one or more signals may be an ICMP echo request, a TTCP request, or other signal requesting latency and/or network distance information.

At block 230, one or more responses to the one or more signals from the one or more clients may be received. For example, a second receiver in the at least one or more centralized servers 120A-120D may receive a response from the requestor based on the first signal and one or more additional responses from the one or more clients based on the one or more signals. In one embodiment, the one or more responses may be an ICMP echo request, a TTCP request, or other signal requesting latency and/or network distance information.

At block 240, one or more latency signatures may be generated. For example, one or more processors at the at least one centralized server may generate a latency signature for the requestor and each of the one or more clients based on the one or more responses. As described above, the one or more latency signatures may provide positioning information associated with the requestor relative to one or more centralized servers in a network and the one or more additional latency signatures provides positioning information of each of the one or more clients relative to one or more centralized servers in a network.

At block 250, the latency signatures may be gathered. For example, the latency signatures acquired by each of the one or more centralized servers may be different. As a result, one or more processors at a given centralized server may gather latency signatures acquired by the other one or more centralized servers so that the latency signatures may be synchronized at one location at a give time. It should be appreciated that each of the centralized servers may gather latency signatures from other sources as well, e.g., one or more remote data storage systems.

At block 260, the latency signatures may be compared. For example, in the event there is more than one latency signature, the latency signatures may be compared to determine optimum connectivity between the one or more clients. In one embodiment, the latency signatures may be compared at one or more processors of each of the centralized servers. In another embodiment, the latency signatures may be compared at one or more processors of the client.

As described above with reference to FIG. 1, it should be appreciated that comparing latency signatures may be automatic, manual, or a combination thereof. Furthermore, comparing latency signatures may include applying various techniques, such as scoring, weighted scoring, least squares, scaling, or other comparison technique.

Scoring may provide one way of comparing latency signatures. For example, a client requesting a plurality of latency signatures may receive a plurality of latency signatures for other potential clients where each of the plurality of latency signatures may also be scored. For instance, a matching latency signature may be given a score of "5," which represents the best fit. A score of "4" may be given to latency signatures that are not exact but differ only by minor variances. Scores of "3," "2," and "1" may be given in a similar fashion, with "1" being the least best fit. In another embodiment, scoring may be provided in terms of rank. In this example, the best fit would be recognized as "1," the second best fit as "2," and so forth. In the event there is a tie in score or rank, a tiebreaker may be provide. The tiebreaker may include additional factors, such as geography, previous network communication, ratings, etc. In other words, if three latency signatures, for example, are tie for being ranked at "3," rather than just labeling each as "3," latency signature comparisons may then take into consideration the geography of the clients, whether or not there were previous communications with these clients and the quality of such communications, and ratings provided by other clients, network providers, etc. As a result, the three latency signatures may be further ranked to provide the requesting client a more detailed comparison and determination of which clients, if connected to, would produce the optimal interactivity and performance.

In another embodiment, scoring and/or ranking may be enhanced by weighting options. For example, latency or network distance to certain centralized servers may be weighted more heavily than other centralized servers. Referring back to FIG. 1, for instance, client 110a may request latency signatures from the other clients 110b-110f. Although clients 110c, 110d, 110f, and 110g may all have roughly the same latency signature to client 110a, client 110c may be ranked higher (e.g., lower number) or have a better score than the other clients if centralized server 120C is weighed more heavily than that of centralized server 120D. Weighting may also be applied to other components or may be based on other factors. For example, in one embodiment, previous gamers that have yielded positive results may receive greater weight during scoring/ranking. In another embodiment, positive ratings of various users (e.g., gamers in gaming applications) may provide a greater weight in scoring/ranking. Other various embodiments may also be provided.

Another technique for comparing latency signatures may include a least squares method. Also known as ordinary least squares analysis, a least squares method may be applied to determine the values of unknown quantities in a statistical model by minimizing the sum of the residuals (the difference between the predicted and observed values) squared. This method, which is typically integrated with most statistical software packages, may also be considered in latency signature comparisons to determine the "best" fit. A least squares comparison technique may be useful for groups of clients. For example, in the event a subscriber is to choose between two groups of gamers to play with, each group having six gamers. The first group of players may have five gamers who have very similar latencies to the subscriber and one gamer that is very different. The second group of players may have six gamers each having latency signatures that are not as close as the first five in the first group and not as different as the sixth gamer in the first group. In this example, a least squares method may be applied to compare the latency signatures of the two groups and determine which group would provide the greatest performance in a particular on-line game.

One application of a squares method may begin with a differences technique. For example, TABLE 1 may depict latency signatures for four (4) users (e.g., Users 1-4) in a network having six (6) centralized servers:

TABLE 1

| Sample Latency Signatures | |
| --- | --- |
| User 1: | [10, 20, 40, 20, 10, 15] |
| User 2: | [15, 20, 35, 50, 5, 25] |
| User 3: | [5, 30, 14, 20, 15, 30] |
| User 4: | [10, 14, 25, 11, 5, 20] |

In this example, assuming User 1 wants to decide which of the User 2, User 3, or User 4 is the "best" fit, the differences technique may compare latency signatures by calculating the difference between User 1 with each of User 2, User 3, and User 4, as follows:

TABLE 2

| Sample Latency Signature Differences | |
| --- | --- |
| Difference between User 1 and User 2: | [5, 0, 5, 30, 5, 10] = [55] |
| Difference between User 1 and User 3: | [5, 10, 26, 0, 5, 15] = [61] |
| Difference between User 1 and User 4: | [0, 6, 15, 9, 5, 5] = [40] |

Once the differences are calculated for each of User 2, User 3, and User 4 with User 1, in one embodiment, the sum of these difference may be summed. Accordingly, User 4 may be the "best" since the total latency signature difference with respect to User 1 is forty (40), followed by User 2 and User 3 having a total latency difference of fifty-five (55) and sixty-one (61), respectively, with respect to User 1, as depicted in TABLE 2.

In another embodiment, a squares method may be provided using a latency signature differences framework. For example, each of the differences in differences in TABLE 2 may be squared. Such a technique may add emphasis to the large differences. Accordingly, TABLE 3 depicts a sample of the latency signature differences of TABLE 2 where each of the differences are squared:

TABLE 3

| Sample Latency Signature Differences (Squared) | |
| --- | --- |
| Difference between User 1 and User 2: | [25, 0, 25, 900, 25, 100] = [1075] |
| Difference between User 1 and User 3: | [25, 100, 676, 0, 25, 225] = [1051] |
| Difference between User 1 and User 4: | [0, 36, 225, 81, 25, 25] = [392] |

In this example, the "best" fitting user may still be User 1 having a total difference (squared) of [392]. However, unlike the direct difference technique, User 3 may be the second best fit with a total difference (squared) of [1051] and User 2 in last with a total difference (squared) of [1075].

Scaling may be another technique that may be useful in comparing latency signatures. In this example, one or more latency signatures may be scaled. For instance, referring back to TABLE 1 of sample latency signatures for Users 1-4, User 3 has a latency signature similar to that of User 1 except that the latency signature of User 3 may have values of approximately ten (10) higher in each slot (e.g., representing ten (10) ms latency from each of the six (6) centralized servers). In one embodiment, this ten (10) ms lag in latency may represent one of may factors, such as bandwidth constraints and/or other latency-causing factors. In some applications, e.g., where latency may be explained and/or corrected, this ten (10) ms latency may be corrected for by scaling. For example, User 3 may be reduced in each slot by ten (10) ms. As a result, the resulting latency signature for User 3 may be [10, 20, 40, 20, 5, 20], which may have a total latency signature difference (e.g., [10]) that is much closer than any of the other users.

It should also be appreciated that method 200 may store one or more latency signatures in one or more data storage systems for future retrieval. In addition, it should be appreciated that the one or more stored latency signatures may also be updated. For example, updating the one or more stored latency signatures may include further transmitting one or more additional signals for one or more updated latency signatures corresponding to the one or more clients, receiving one or more new responses from the one or more clients, generating one or more updated latency signatures based on the one or more new responses, and updating the one or more latency signatures in the one or more storage devices by replacing the stored one or more latency requests with the one or more updated latency requests. Updating the one or more latency signatures may be real-time or near real-time updating. In another embodiment, rather than replacing latency signatures with updated latency signatures, all latency signatures may be stored. In this example, the latency signatures may be stored with information relating to a date, time, server/client storing the information, etc. As a result, no latency signatures may be lost by replacement. It should be appreciated that the updated latency signatures may be stored at the centralized servers, clients, other data storage systems, or a combination thereof. Additionally, it should be appreciated that method 200 may further include synchronizing the centralized servers to compile one or more updated latency signatures for storage at one or more storages devices.

Figure 3:
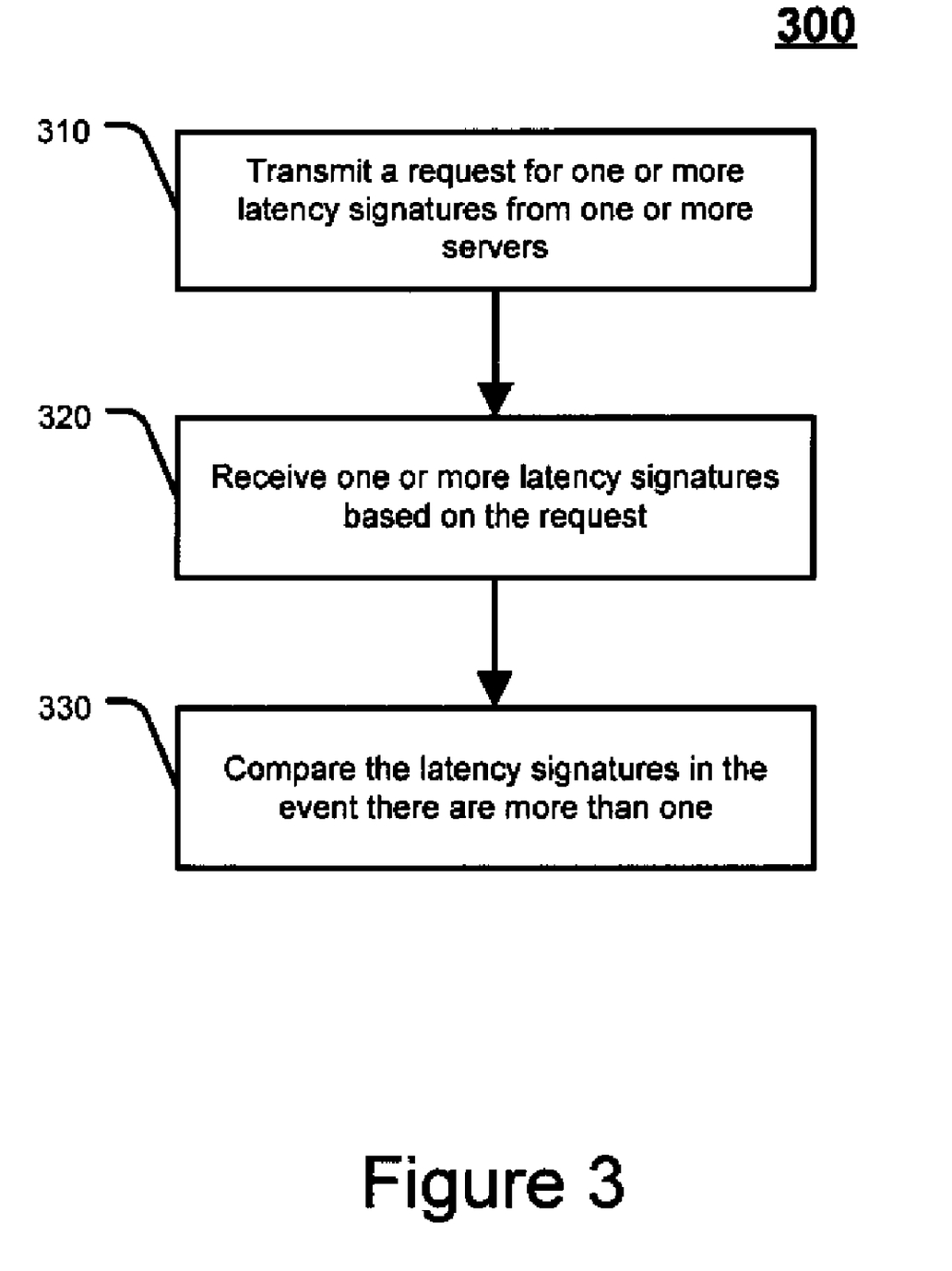
FIG. 3 depicts a flowchart of a method for providing latency signatures, according to an exemplary embodiment.

FIG. 3 depicts a flowchart of a method for providing latency signatures 300, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 310.

At block 310, one or more latency signatures may be requested. For example, a transmitter at a client may transmit a request for one or more latency signatures from one or more servers, e.g., the centralized servers 120A-120D. As described above, the one or more latency signatures may provide positioning information of one or more clients relative to the one or more servers in a network. In one embodiment, the request may be an ICMP (Internet Control Message Protocol) echo request, a TTCP (Test Transmission Control Protocol) request, or other signal requesting latency and/or network distance information.

At block 320, one or more latency signatures may be received. For example, a receiver at a client may receive one or more latency signatures from the one or more servers based on the request for one or more latency signatures. One or more processors at the at least one centralized server may generate one or more latency signatures based on the request.

At block 330, one or more latency signatures may be compared. For example, in the event there is more than one latency signature, the one or more latency signatures may be compared to determine optimum connectivity between the one or more clients. In one embodiment, the latency signatures may be compared at one or more processors of each of the centralized servers. In another embodiment, the latency signatures may be compared at one or more processors of the client.

It should be appreciated that latency signatures may be achieved for at least the reasons discussed above with regard to the one or more centralized servers. For example, comparing the latency signatures may be automatic, semi-automatic, manual, or a combination thereof, and may include applying various techniques, such as scoring, weighted scoring, least squares, scaling, or other comparison technique.

It should also be appreciated that method 300 may also store one or more latency signatures in one or more data storage systems for future retrieval. Furthermore, the method 300 may also update the one or more latency signatures by transmitting an additional request for one or more updated latency signatures corresponding to the one or more clients from one or more servers, receiving one or more updated latency signatures from the one or more servers based on the additional request, and replacing the stored one or more latency requests with the one or more updated latency requests. It should be appreciated that updating the one or more latency signatures may include real-time or near real-time updating.

It should further be appreciated that while method 300 is directed to centralized servers generating the one or more latency signatures, the latency signatures may also be generated at the one or more clients.

It should be appreciated that applications hosted by third party servers, e.g., a game hosted by a game server, may also apply the techniques for acquiring and/or generating latency signatures. For example, in one embodiment, a third part application server, e.g., a game server, may function similar to a client system. In this example, the game server may transmit requests for latency signatures of other gamers by sending requests to one or more centralized servers. Once the latency signatures are received from the one or more centralized servers, the game server may have the necessary information to determine which gaming connections to provide the optimal gaming experience based on the latency signatures. In another embodiment, a third party application servers may function similar to a centralized server. For example, various gamers may send signals to these third party game servers, which will in turn respond to the various requests and provide each gamer with latency signatures to determine with whom to connect and play. Other various embodiments may also be provided.

In addition to the benefits described above, embodiments of the system and method for providing latency signatures not only provide an effective and improved technique for network communication and interactivity in peer-to-peer applications, but also may allow network providers (e.g., ISP) the ability to service a larger subscriber pool since existing protocols may remain intact because there may be minimal changes (if any) in hardware and/or network design. Moreover, advantages in business and marketing may also be apparent. Providing such a technique for providing latency signatures may maximize advertisement and marketing opportunities with third party vendors, etc., which may not otherwise be provided. For example, when requesting latency signatures, advertisements and other commercial information may also be presented to one or more subscribers.

While the features and functionalities of the providing latency signatures primarily discussed with respect to the embodiments above, it should be appreciated that the features and functionalities of one embodiment may be similarly applied to other embodiments. For example, it should be appreciated that latency signatures may also be applied to TV network providers, multimedia providers (e.g., music file provider), etc. Furthermore, while the multimedia content is described primarily in reference to client systems, servers, and networks, it should be appreciated that the functions and features of the embodiments of the system and method may apply similarly to a host of other multimedia and non-multimedia content as well, where applicable.

While the embodiments described above may be directed to the centralized servers 120A-120D and the client systems 110a-110f to provide latency signatures as discussed above, it should be appreciated that other components may include processing capabilities to perform the features described above as well. These may include other systems, components, and/or servers in the network provider, the client, or the entire network. Additionally, it should be appreciated that one or more of these devices and/or components may be combined to provide the latency signature features described above.

Furthermore, although the embodiments described above are directed toward network performance and on-line interactivity, it may be readily appreciated that the features and may apply to any video, audio, or web-based component as well.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
transmitting, to one or more centralized servers, a request for one or more latency signatures, wherein the one or more latency signatures provides positioning information as a function of time for each client relative to the one or more centralized servers in a network;
receiving, from the one or more centralized servers, one or more latency signatures for each requested client based at least in part on the request for the one or more latency signatures;
storing, in one or more data storage systems, the one or more latency signatures for future retrieval;
comparing the latency signatures in the event there is more than one latency signature; and
updating the one or more latency signatures comprising:
transmitting, to the one or more centralized servers, an additional request for one or more updated latency signatures corresponding to the each requested client;
receiving, from the one or more centralized servers, the one or more updated latency signatures based on the additional request; and
storing the one or more updated latency signatures in the one or more data storage systems.

2. The method of claim 1, wherein comparing the one or more latency signatures comprises determining optimum connectivity between one or more clients.

3. The method of claim 2, wherein comparing the one or more latency signatures is automatic, semi-automatic, or manual.

4. The method of claim 2, wherein comparing the one or more latency signatures comprises applying at least one of scoring, weighted scoring, least squares, differences, and scaling.

5. The method of claim 1, wherein the latency signatures are used in at least one of the following applications: file sharing, gaming, social networking, and advertising.

6. The method of claim 1, wherein the request comprises at least one of an ICMP (Internet Control Message Protocol) echo request and a TTCP (Test Transmission Control Protocol) request.

7. The method of claim 1, wherein updating the one or more latency signatures comprises real-time or near real-time updating.

8. The method of claim 1, further comprising outputting, at one or more output devices, the one or more latency signatures.

9. A non-transitory computer readable storage media comprising code to perform the acts of the method of claim 1.

10. A system, comprising:
a transmitter configured to transmit, to one or more centralized servers, a request for one or more latency signatures and an additional request for one or more updated latency signatures, wherein the one or more latency signatures provides positioning information as a function of time of one or more clients relative to the one or more centralized servers in a network;
a receiver configured to receive, from the one or more centralized servers, the one or more latency signatures based on the request for the one or more latency signatures and the one or more updated latency signatures based on the additional request for the one or more updated latency signatures;
a data storage configured to store, the one or more latency signatures for future retrieval and the one or more updated latency signatures; and
one or more processors configured to compare the one or more latency signatures in the event there is more than one latency signature for determining optimum connectivity between the one or more clients.

11. A method, comprising:
receiving a request via a network, from a requestor, for a first latency signature corresponding to the requestor, and one or more additional requests, from one or more additional requestors, for one or more additional latency signatures corresponding to the one or more additional requestors, wherein the first latency signature provides positioning information associated with the requestor relative to one or more centralized servers in a network and the one or more additional latency signatures provides positioning information of each of the one or more additional requestors relative to one or more centralized servers in a network;
generating a first latency signature for the requestor based on the request and the one or more additional latency signatures for each of the one or more additional requestors based on the one or more additional requests;
transmitting, to the requestor and the one or more additional requestors via the network, the first latency signature and the one or more additional latency signatures; and
updating the first latency signature and the one or more additional latency signatures comprising:
receiving an update request from the requestor and one or more update requests from the one or more additional requestors;
generating a first updated latency signature based on the update request and one or more additional updated latency signatures based on the one or more update requests; and transmitting, to the requestor, one or more update signals for the first updated latency signature corresponding to the requestor, and transmitting, to the one or more additional requestors, the one or more additional updated latency signatures corresponding to the one or more additional requestors.

12. The method of claim 11, further comprising comparing the first latency signature with the one or more additional latency signatures to determine optimum connectivity between the requestor and the one or more clients.

13. The method of claim 12, wherein comparing the first latency signature with the one or more additional latency signatures is automatic, semi-automatic, or manual.

14. The method of claim 12, wherein comparing the first latency signature with the one or more additional latency signatures comprises applying at least one of scoring, weighted scoring, least squares, differences, and scaling.

15. The method of claim 11, wherein the first latency signature and the one or more additional latency signatures are used in at least one of the following applications: file sharing, gaming, social networking, and advertising.

16. The method of claim 11, wherein each of the requests comprises at least one of an ICMP (Internet Control Message Protocol) echo request and a TTCP (Test Transmission Control Protocol) request.

17. The method of claim 11, further comprising storing the first latency signature and the one or more additional latency signatures in one or more data storage systems for future retrieval.

18. The method of claim 17, wherein updating the first latency signature and the one or more additional latency signatures stored in the one or more data storage systems.

19. The method of claim 18, wherein updating the first latency signature and the one or more additional latency signatures stored in the one or more data storage systems further comprises:
updating, in the one or more storage systems, the first latency signature and the one or more additional latency signatures by storing the first updated latency signature and the one or more additional updated latency signatures.

20. The method of claim 19, further comprising synchronizing the first updated latency signature and the one or more updated latency signatures with information stored at one or more other centralized servers.

21. The method of claim 18, wherein updating the first latency signature and the one or more additional latency signatures comprises real-time or near real-time updating.

22. The method of claim 11, further comprising outputting, at one or more output devices, the one or more latency signatures.

23. A non-transitory computer readable storage media comprising code to perform the acts of the method of claim 11.

24. A system, comprising:
a receiver to receive a request, from a requestor, for a first latency signature corresponding to the requestor, an update request, from the requestor, for a first updated latency signature corresponding to the requestor, one or more additional requests, from one or more additional requestors, for one or more additional latency signatures corresponding to the one or more additional requestors, and one or more additional update requests, from the one or more additional requestors, for one or more additional updated latency signatures corresponding to the one or more additional requestors, wherein the first latency signature provides positioning information associated with the requestor relative to one or more centralized servers in a network and the one or more additional latency signatures provides positioning information of each of the one or more additional requestors relative to the one or more centralized servers in the network;
one or more processors to generate the first latency signature for the requestor based on the request, the first updated latency signature for the requestor based on the update request, the one or more additional latency signatures for each of the one or more additional requestors based on the one or more additional requests, the one or more additional updated latency signatures for each of the one or more additional requestors based on the one or more additional update requests, and to compare the first latency signature with the one or more additional latency signatures to determine optimum connectivity between the requestor and the one or more clients; and
a transmitter to transmit, to the requestor and the one or more additional requestors, the first latency signature, the first updated latency signatures, the one or more additional latency signatures, and the one or more additional updated latency signatures.

25. A method, comprising:
receiving a request via a network, from a requestor, for a first latency signature corresponding to the requestor and for one or more additional latency signatures corresponding to one or more additional clients, wherein the first latency signature provides positioning information associated with the requestor relative to one or more centralized servers in a network and the one or more additional latency signatures provides positioning information of each of the one or more additional clients relative to the one or more centralized servers in the network;
transmitting to the requestor a first signal and one or more additional signals via the network to the one or more clients based on the request for the first latency signature and the one or more additional latency signatures;
receiving a response via the network from the requestor based on the first signal and one or more additional responses from the one or more clients based on the one or more signals;
generating a latency signature for the requestor and each of the one or more clients; and
updating the first latency signature and the one or more additional latency signatures comprising:
receiving an update request from the requestor;
generating a first updated latency signature based on the updated request and one or more additional updated latency signatures based on the updated request; and
transmitting, to the requestor, one or more update signals for the first updated latency signature and the one or more additional updated latency signatures.

* * * * *